United States Patent [19]

Yamazaki et al.

[11] Patent Number: 4,949,592

[45] Date of Patent: Aug. 21, 1990

[54] PEDAL-OPERATED PARKING BRAKE

[75] Inventors: Takeo Yamazaki, Anjo; Takuya Inaba, Hekinan; Kiyoaki Suesaka, Kariya, all of Japan

[73] Assignee: Aisin Seiki Kabushiki Kaisha, Kariya, Japan

[21] Appl. No.: 199,198

[22] Filed: May 26, 1988

[30] Foreign Application Priority Data

| May 29, 1987 | [JP] | Japan | 62-80881[U] |
| May 29, 1987 | [JP] | Japan | 62-80883[U] |
| Jul. 25, 1987 | [JP] | Japan | 62-114291[U] |
| Jul. 25, 1987 | [JP] | Japan | 62-114292[U] |

[51] Int. Cl.$^5$ ............................................. G05G 1/14
[52] U.S. Cl. .................................. 74/512; 74/529; 74/539; 74/540
[58] Field of Search ............... 74/512, 513, 501.5 R, 74/535, 529, 542, 560, 564, 514, 539, 540, 575, 577 R, 577 S, 500.5; 192/111 A; 188/2 C

[56] References Cited

U.S. PATENT DOCUMENTS

| 4,441,380 | 4/1984 | Kawaguchi et al. | 74/512 |
| 4,597,307 | 7/1986 | Kawaguchi et al. | 74/512 |
| 4,621,538 | 11/1986 | Senft et al. | 74/512 |
| 4,773,278 | 9/1988 | Hanaoka et al. | 74/500.5 |
| 4,800,774 | 1/1989 | Hagiwara et al. | 74/560 X |
| 4,819,500 | 4/1983 | Musumiya et al. | 74/513 |
| 4,841,798 | 6/1989 | Porter et al. | 74/542 X |

FOREIGN PATENT DOCUMENTS

| 725889 | 1/1966 | Canada | 74/512 |
| 2156736 | 1/1981 | Fed. Rep. of Germany | 74/512 |
| 5644955 | 9/1979 | Japan | 74/512 |
| 0055022 | 4/1980 | Japan | 74/513 |
| 5717854 | 7/1980 | Japan | 74/512 |
| 0018555 | 1/1982 | Japan | 74/512 |
| 57-37056 | 3/1982 | Japan | 74/512 |
| 2041471 | 9/1980 | United Kingdom | 74/512 |
| 2156750A | 10/1985 | United Kingdom | 74/512 |
| 2184524 | 6/1987 | United Kingdom | 74/512 |

*Primary Examiner*—Vinh T. Luong
*Attorney, Agent, or Firm*—Burns, Doane, Swecker & Mathis

[57] ABSTRACT

A pedal-operated parking brake for use in an automotive vehicle with a brake pedal lever mounted on a bracket which is secured to the vehicle body. The parking brake has a sector with teeth formed on its arcuate end portion, which is easily fixed to the brake pedal lever through a single connecting pin. A pawl having a tooth engageable with the teeth of the sector is pivotally mounted on the bracket and biased in a direction to urge the pawl to engage with the sector, and also pivotally mounted is a release lever for biasing the pawl in a direction to urge the pawl to disengage from the sector. The parking brake is provided with a damper for absorbing the shocks in stopping the rotation of the brake pedal lever and positioning the brake pedal lever. The damper includes a cylindrical resilient member which is easily mounted on a support pin which is fixed to the bracket perpendicularly to the pivoting plane of the brake pedal lever. The spring for biasing the release lever may be disposed in an opening defined in the bracket.

4 Claims, 4 Drawing Sheets

PEDAL-OPERATED PARKING BRAKE

BACKGROUND OF THE INVENTION

1. Field of the Invention

The present invention relates to a pedal-operated parking brake for an automotive vehicle, and more particularly to parking brake assembly with a foot brake pedal easily assembled and adapted to be secured to a fixed portion of the vehicle.

2. Description of the Prior Art

A conventional pedal-operated parking brake is generally mounted on a fixed portion of the vehicle in the vehicle driver's foot space. When the parking brake is to be applied, the foot brake pedal is depressed by the driver's foot so that a tension force on a brake cable is exerted through a brake pedal lever and transmitted to cables to actuate brakes on the vehicle wheels. At the same time, the brake pedal lever is engaged with a pawl and prevented from pivoting, so that it is held in a locked condition. When the vehicle is started, a release knob is pulled for actuating a release lever to disengage the pawl from the brake pedal lever. Eventually, the brake pedal lever is unlocked.

When the brake pedal lever is returned to its initial position with a tension force applied thereto, it is blocked resiliently by a damper. This damper may be mounted on the bracket in the same plane as the pivoting plane on which the brake pedal lever pivots about its pivot pin mounted on the bracket, as disclosed in Japanese Utility Model laid-open publication No. 56-44955 (1981) or Patent laid-open publication No. 57-37056 (1982). This damper is easily assembled on the bracket by simply forcing a support shaft for a rubber member to insert into a bore formed on a support arm extending from the bracket so that the support shaft is disposed in the same plane as the pivoting plane of the brake pedal lever. In this damper, therefore, the support arm extending outwardly from the bracket is to be disposed, whereby additional space is necessitated. On the other hand, the damper may be mounted on a support pin fixed to the bracket perpendicularly to the pivoting plane as disclosed in British Patent No. 2,156,750, so that its side wall contacts the brake pedal lever in its blocking operation. However, this damper is assembled in such manner that the resilient member is mounted on the support pin and then calking process is applied to the support pin, or a nut is screwed on a threaded portion of the support pin. Accordingly, the parking brake assembly with the above described damper is hardly assembled in an automatic assembly line.

The pawl has a tooth which is engageable with gear teeth of a sector or a ratchet wheel member which is fixed to the brake pedal lever. The sector is sometimes made independently from the brake pedal lever and assembled theretogether, since the brake pedal lever and the sector are made of different material for several reasons, e.g. their weight, hardness or cost. In assembling them, however, a pair of connecting pins are inserted into corresponding bores which penetrate both the brake pedal lever and the sector, and then the connecting pins are calked to fasten them tightly, as disclosed, for example, in Japanese Utility Model laid-open publication No. 57-17854 (1982). Similarly, two rivets are used for fixing a sector to a bracket in U.S. Pat. No. 4,597,307. Thus, two connecting pins or rivets are to be disposed, and the calking process is necessitated at least two times. In this connection, single calking process may be applied, but causes other defects.

In the prior pedal-operated parking brake assembly as disclosed in the above British Patent or Japanese laid-open publications of Patent or Utility Models, the release lever, the pawl and the brake pedal lever are overlapped. Also overlapped is a return spring for biasing the release lever in the direction to urge the pawl to disengage from the brake pedal lever. Accordingly, the thickness of the parking brake assembly as a whole becomes quite large, since not only the thicknesses of every components are totalized but also a certain clearance is to be provided between each component. The pawl and the release lever are biased by each spring independently in the aforementioned prior parking assembly, as cleary shown in the Japanese Patent laid-open publication No. 57-37056, where the release lever is pivotally mounted on a supplemental bracket.

SUMMARY OF THE INVENTION

It is, therefore, a primary object of the present invention to provide a pedal-operated parking brake which is small in size, light in weight and economical to manufacture.

It is another object of the present invention to provide a pedal-operated parking brake with a sector easily fixed to a brake pedal lever.

It is further object of the present invention to provide the parking brake with a damper which is easily mounted on a bracket and may be automatically assembled.

It is yet further object of the present invention to provide the parking brake with biasing means disposed in a space effectively defined within the parking brake.

In accomplishing these and other objects, a pedal-operated parking brake according to the present invention comprises (1) a bracket secured to a vehicle body, (2) a brake pedal lever pivotally mounted on the bracket, (3) a sector having an arcuate end portion with teeth formed thereon, which is fixed to the brake pedal lever, (4) a pawl having at least a tooth at one end thereof, which is pivotally mounted on the bracket and biased toward the sector, so that the tooth of the pawl engages with the teeth of the sector, and (5) a release lever pivotally mounted on the bracket and associated with said pawl for disengaging the pawl from the sector. In this arrangement, the sector is fixed to the brake pedal lever through positioning means for positioning the sector on the brake pedal lever, and fastening means for fastening the sector to the brake pedal lever. Namely, the sector is positioned on the brake pedal lever by the positioning means and fastened to it by the fastening means. Thus, they are easily assembled, and the fastening means may be simple comparing with the prior two connecting pins, or two rivets.

The positioning means preferably comprises at least one protrusion formed on one of the sector and the brake pedal lever, and at least one recess for receiving the protrusion formed on the other of the sector and the brake pedal lever, and the fastening means preferably comprises a connecting pin for penetrating the sector and the brake pedal lever, and connecting therebetween. Thus, they are assembled easily and united firmly, with the protrusion received in the recess, and with the single connecting pin fastened between them.

The parking brake preferably comprises a damper mounted on the bracket, which includes a support pin having a tapered free end portion with a top end and a flange portion gradually extending outwardly therefrom, which is secured to the bracket on an axis substantially parallel with a pivot axis of the brake pedal lever for blocking rotation of the brake pedal lever moving perpendicularly to the pivot axis, and includes a cylindrical resilient member which is mounted on the support pin through the free end portion and held by the flange portion. Accordingly, the damper is easily assembled on the bracket by simply pressing the cylindrical resilient member toward the support pin.

In the parking brake having a bracket in which at least an opening is defined, the biasing means for biasing the release lever in a direction to urge the pawl to disengage from the sector may be disposed in the opening of the bracket. In this embodiment, therefore, the parking brake is formed light in weight, and the thickness of the parking brake is reduced so that the vehicle driver's foot space becomes large comparing with the prior parking brakes.

The parking brake may be so arranged that the release lever, which is pivotally mounted on the bracket for disengaging the pawl from the sector, is pivotally mounted on the lever pivot pin secured to the bracket with a torsion spring which is wrapped about the lever pivot pin, and that the torsion spring is connected to the pawl at one end thereof and connected to the release lever at the other end thereof so that the pawl and the release lever are biased in a direction to urge the pawl to engage with the sector. On this bracket, mounted is means for preventing the release lever from rotating over its initial position where the pawl is held engageable with the sector.

BRIEF DESCRIPTION OF THE DRAWINGS

The above stated objects and following description will become readily apparent with reference to the accompanying drawings, in which:

FIG. 1 is a front view of the pedal-operated parking brake in accordance with the present invention;

DESCRIPTION OF THE PREFERRED EMBODIMENTS

Figure 1A:
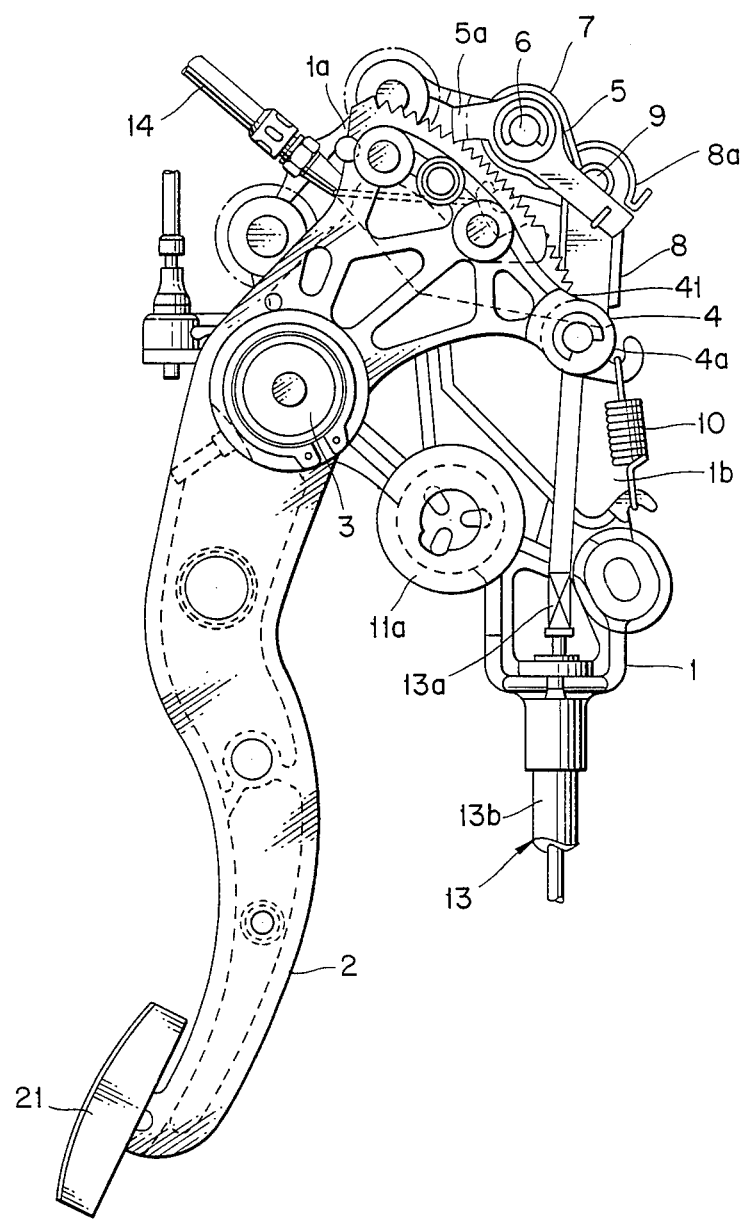
FIG. 1a is similar to FIG. 1 but shows the position when the pawl engages with the sector.
Figure 2:
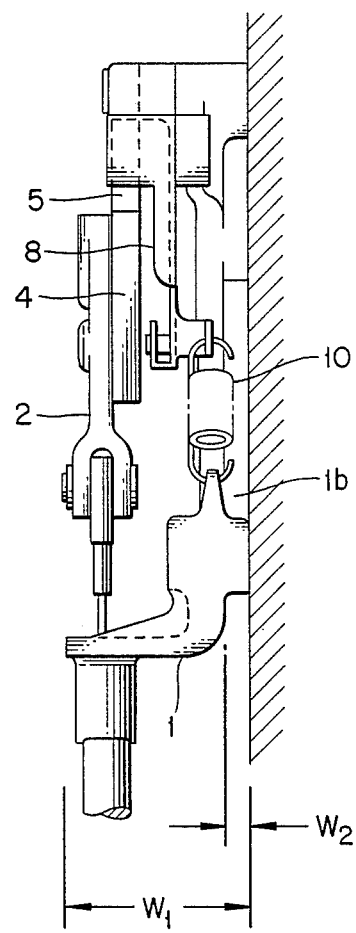
FIG. 2 is a side view of the pedal-operated parking brake shown in FIG. 1.

Referring to FIGS. 1 and 2, a bracket 1 is formed by a plate having a plurality of openings 1a and at least one cutout 1b at its periphery, so that the bracket 1 is formed light in weight, comparing with a bracket formed by a solid plate, maintaining its strength sufficiently to hold a plurality of pins disposed thereon. The bracket 1 is secured to a fixed portion of a vehicle body (not shown), preferably to a front cowl thereof.

Figure 3:
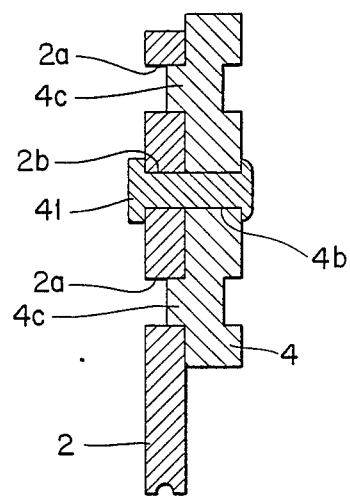
FIG. 3 is a fragmentary sectional view of a brake pedal lever and a sector fixed thereto shown in FIGS. 1 and 2.

A brake pedal lever 2 is mounted at its approximately middle portion on a lever pivot pin 3, which is secured to the bracket 1, so as to be pivotally movable about the axis of the lever pivot pin 3. The brake pedal lever 2 is provided with a brake pedal 21 at its one end and a sector 4 at its the other end. The brake pedal lever 2 is rotated about the lever pivot pin 3 when the brake pedal 21 is deppressed by a driver's foot. At the other end of the brake pedal lever 2, formed are a pair of bores 2a, which correspond to the recesses in the present invention, and a bore 2b which is positioned between the bores 2a, as shown in FIG. 3.

The sector 4 is an arcuate plate having teeth 4a formed on its arcuate edge surface, extending along a substantial part of the arcuate edge. On a plane outer surface of the sector 4, formed by stamping are a pair of protrusions 4c which are inserted into the bores 2a when the sector 4 is connected to the brake pedal lever 2, as shown in FIG. 3. Between these protrusions 4c, formed is a bore 4b which forms with the bore 2b of the brake pedal lever 2 a hole receiving a connecting pin 41 which penetrates therethrough. The protrusions 4c may be formed by molding, but will be formed at the same time when the bore 4b is punched out by a press machine. The height of the protrusions 4c may be varied by adjusting strokes of punches in the press machine. Accordingly, when the sector 4 is connected to the brake pedal lever 2, the protrusions 4c of the sector 4 are inserted into the bores 2a of the brake pedal lever 2 respectively, so that the bore 2b and the bore 4b form the hole for receiving the connecting pin 41. Then, the connecting pin 41 is inserted and penetrated through the bore 2b and the bore 4b, and calked at its both end portions so as to fasten the brake pedal lever 2 and the sector 4 tightly.

Thus, the sector 4 is positioned by the protrusions 4c and the bores 2a, and then fastened by the single connecting pin 41 with the single calking process applied thereto. With the sector 4 fixed to the brake pedal lever 2 in the above-described manner, differences in size, position of the hole and etc. between them do not cause any backlash which sometimes exists in the prior manner employing two connecting pins calked simultaneously. A pair of recesses may be formed on the brake pedal lever 2 for the bores 2a. The protrusions 4c and the bores 2a may be formed at more than two positions respectively. Contrary to this embodiment, the protrusions may be formed on the sector 4 and the bores or recesses may be formed on the brake pedal lever 2.

Facing with the teeth 4a of the sector 4, a pawl 5 is pivotally mounted at its approximately middle portion on a pawl pivot pin 6 which is fixedly connected to the bracket 1, so that the pawl 5 is positioned in the plane of the sector 4, as shown in FIG. 2. The pawl 5 is formed at its one end with a tooth 5a which is engageable with the teeth 4a of the sector 4. The pawl 5 is positioned to be selectively engaged with and disengaged from the teeth 4a of the sector 4. The tooth 5a of the pawl 5 is also arranged to ratchet over the teeth 4a of the sector 4 when the brake pedal lever 2 is moved in a counterclockwise direction about the axis of the lever pivot pin 3. The other end of the pawl 5 is connected to a spring 7 which is disposed between the pawl 5 and the bracket 1, and which biases the pawl 5 in the counterclockwise direction in FIG. 1, namely biasing the tooth 5a of the pawl 5 toward the teeth 4a for engagement therewith.

A release lever 8 is also pivotally mounted on a lever pivot pin 9 which is fixedly connected to the bracket 1. The release lever 8 has a flange portion 8a extending from its periphery in parallel with the axis of the lever pivot pin 9 or perpendicularly to the plane of the release lever 8. An end portion of this flange portion 8a abutts on the other end of the pawl 5 for blocking rotation of the pawl 5 about the pawl pivot pin 6 in the counterclockwise direction. On a free end of the release lever 8 formed is a hook which connects one end of a return spring 10, the other end of which is connected to another hook formed on the bracket 1. Accordingly, the release lever 8 is biased by the return spring 10 in the clockwise direction around the lever pivot pin 9 as shown in FIG. 1, that is the pawl 5 is biased by the return spring 10 in a direction to urge the tooth 5a away from the teeth 4a of the sector 4.

The return spring 10 is disposed in a space defined by the cutout 1b, as shown in FIGS. 1 and 2, so that the thickness ($W_1$) of the present parking brake assembly as a whole is reduced by the sum of the thickness of the bracket 1 and the thickness ($W_2$) of a base for installation of the return spring 10 comparing with the prior parking brake assembly. Accordingly, wider space is provided for the vehicle driver and a tortional force applied to the bracket 1 in braking operation is reduced.

A release cable 14 is connected to the free end of the release lever 8 so that the release lever 8 is rotated clockwise when the release cable 14 is pulled against the biasing force of the return spring 10. An inner cable 13a of a parking brake cable 13 is connected to an end portion of the brake pedal lever 2 near the sector 4, whereas an outer cable 13b of the parking brake cable 13 is connected to the bracket 1. The parking brake cable 13 is connected to known brakes or braking apparatus disposed on vehicle wheels. The brake pedal lever 2 is tensioned by the brakes through the inner cable 13a, and the counterclockwise movement of the brake pedal lever 2 will tension the inner cable 13a to actuate the brakes.

A damper 11 has a resilient member 11a mounted on a support pin 12 which is secured to the bracket 1. The axis of the support pin 12 is parallel with the axis of the lever pivot pin 3 so that the brake pedal lever 2 moves in the plane perpendicular to the axis of the support pin 12 when the brake pedal lever 2 rotates about the lever pivot pin 3. The resilient member 11a is a cylindrical member made of resilient material such as rubber. The damper 11 resiliently absorbs shocks on the brake pedal lever 2 when the brake pedal lever 2 returns to its initial position, and the damper 11 positions the brake pedal lever 2 in its initial position when returned.

Figure 4:
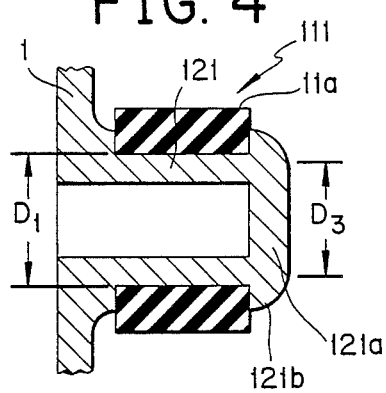
FIG. 4 is a fragmentary sectional view of one embodiment of a damper disposed in the pedal-operated parking brake in accordance with the present invention.
Figure 5:
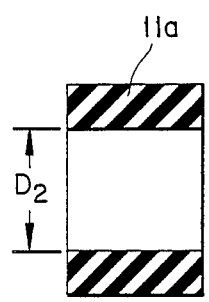
FIG. 5 is a sectional view of a resilient member for use in the damper shown in FIG. 4.
Figure 6:
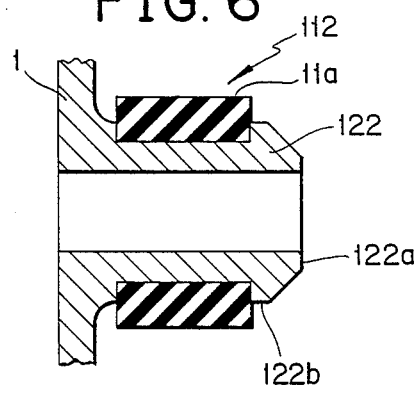
FIGS. 6, 7 and 8 are fragmentary sectional views of other embodiments of the damper disposed in the pedal-operated parking brake.
Figure 7:
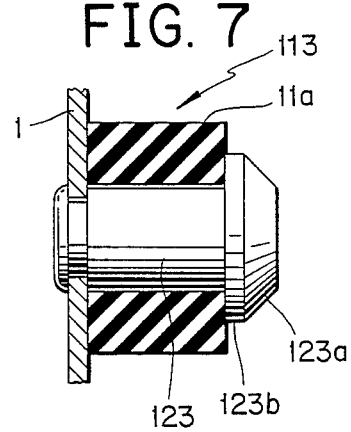
Figure 8:
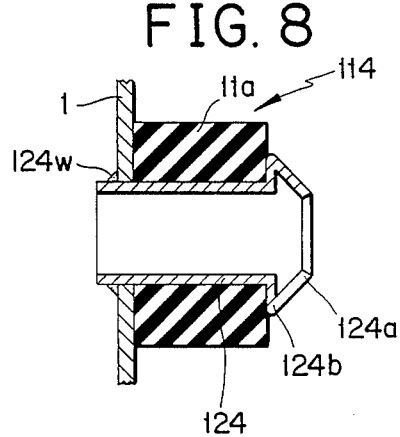
Figure 9:
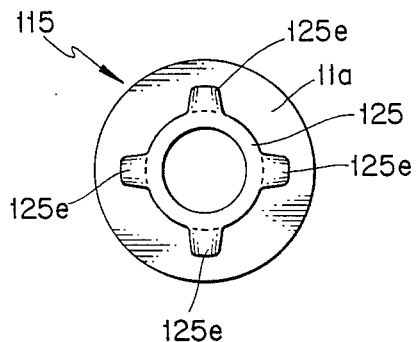
FIG. 9 is a fragmentary plan view of another embodiment of the damper shown in FIG. 4.

FIGS. 4 to 9 illustrate other embodiments of the damper, i.e. dampers 111 to 115. In FIGS. 4 and 6, support pins 121 and 122 are formed integral with the bracket 1. In FIGS. 7 and 8, a support pin 123 is calked to the bracket 1 and includes an integral head portion 123a sloping away from a shoulder portion 123b circumferentially surrounding the head portion. A support pin 124 in FIG. 8 is welded to the bracket 1 at weld spots 124w. The cylindrical resilient member 11a is held tightly on each of the support pins 121 to 124. In these embodiments of the support pin, their free end portions 121a to 124a are tapered and extending radially outwardly to form flange portions 121b to 124b. The tapered free end portions 122a, 123a and 124a have flat surfaces at their tapered portions, whereas the tapered free end portion 121a has a curved surface. The flange portion may be a part of the free end portion extending radially like four extensions 125e integral with a support pin 125 of the damper 115 shown in FIG. 9. As illustrated in FIGS. 4 and 5, when an outer diameter of a body portion of the support pin 121 is designated as "$D_1$", an inner diameter of the hollow portion of the resilient member 11a is designated as "$D_2$", and an outer diameter of a top end of the end portion 121a is designated as "$D_3$", those diameters are so determined as to meet "$D_1 > D_2 > D_3$".

Accordingly, the resilient member 11a is assembled with the support pin 121 to form the damper 111 in the following manner. At the outset, the cylindrical resilient member 11a is positioned coaxially with the support pin 121, facing with the end portion 121a. Then, the resilient member 11a is moved axially toward the support pin 121 and pressed onto the end portion 121a. By pressing the resilient member 11a toward the flange portion 121b, the hollow portion of the resilient member 11a is expanded gradually along with the tapered surface of the end portion 121a. Further movement of the resilient member 11a makes the hollow portion of the resilient member 11a ride over the flange portion 121b and be fitted into a space between the bracket 1 and the flange portion 121b. Then, the resilient member 11a is fixed tightly around the body portion of the support pin 121. Thus, the resilient member 11a is mounted on the support pin 121 by simply pressing the resilient member 11a toward the support pin 121 in a coaxiall relationship therewith, so that they can be assembled automatically.

In operation, referring back to FIG. 1, when the brake pedal 21 is depressed in parking brake operation and the brake pedal lever 2 is moved counterclockwise, the sector 4 is pivoted about the lever pivot pin 3 in the counterclockwise direction. Accordingly, the inner cable 13a of the parking brake cable 13 is pulled up and at the same time the teeth 4a of the sector 4 is positioned in such a position that the teeth 4a contact with the tooth 5a of the pawl 5. In accordance with further movement of the brake pedal lever 2, the tooth 5a of the pawl 5 ratchets on the teeth 4a of the sector 4. When the brake pedal 21 is released from depression, the teeth 4a of the sector 4 are engaged with the tooth 5a of the pawl 5 so that the parking brake cable 13 is held in a locked position and adequate braking power for parking the vehicle is applied to the vehicle wheels.

When the parking brake is to be released, the release knob (not shown) is pulled so that the release lever 8 is rotated about the lever pivot pin 9 in the counterclockwise direction through the release cable 14 against the biasing force of the return spring 10. Then, the release lever 8 rotates the pawl 5 in the same direction and disengages the tooth 5a of the pawl 5 from the teeth 4a of the sector 4. Consequently, the brake pedal lever 2 is returned to its initial position by the tension force which is transmitted to the brake pedal lever 2 through the parking brake cable 13. When the release knob is set free soon after the brake pedal lever 2 is returned to the initial position, the release lever 8 is rotated to its initial position by virtue of the biasing force of the return spring 10.

Figure 10:
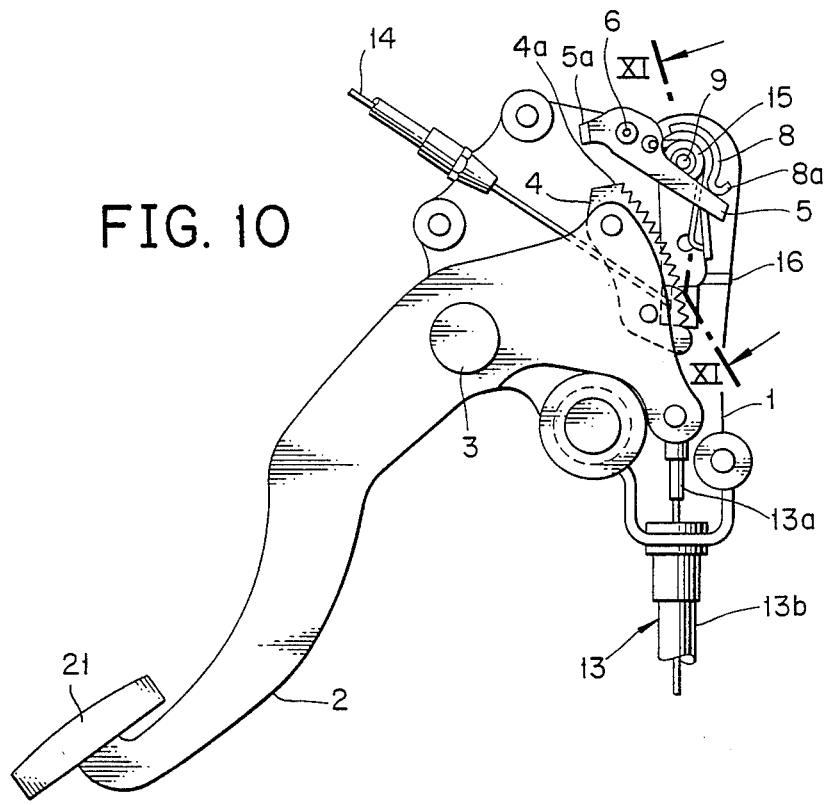
FIG. 10 is a schematic illustration of a front view of another embodiment of the present invention.
Figure 11:
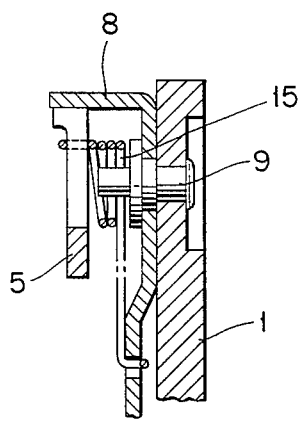
FIG. 11 is a sectional view taken along line XI—XI in FIG. 10.

FIG. 10 shows another embodiment of the present invention. FIG. 10 is a schematical front view of the parking brake assembly which is essentially the same as that illustrated in FIGS. 1 to 3, and in which like numerals denote like elements in those figures. The significant difference is that the return spring 10 is not disposed on the bracket 1 in this embodiment disclosed in FIG. 10, but only a torsion spring 15 is disposed between the pawl 5 and the release lever 8. The torsion spring 15 is wrapped about the lever pivot pin 9, and its one end is engaged with the pawl 5 and the other end is engaged with the release lever 8 so that the pawl 5 and the release lever 8 are urged in a counterclockwise direction about the lever pivot pin 9 in FIG. 10. Namely, the tooth 5a of the pawl 5 is continually urged out of engagement with the teeth 4a of the sector 4. The release lever 8 is positioned by a blocking member 16 mounted on the bracket 1 so that the release lever 8 is prevented from rotating counterclockwise over the blocking member 16, i.e. its initial position.

In operation of the pawl 5 and the release lever 8 in this embodiment, the torsion spring 15 is normally biasing the pawl 5 in the counterclockwise direction. When the release cable 14 is pulled for the clockwise movement of the release lever 8, the release lever 8 is rotated against the biasing force by the torsion spring 15. Thus, the pawl 5 and the release lever 8 are biased in their adequate directions by the single torsion spring 15, and function in the same manner as in the aforementioned embodiment shown in FIGS. 1 to 3.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A pedal-operated parking brake for use in an automotive vehicle comprising:
   a bracket secured to a vehicle body;
   a brake pedal lever pivotally mounted on said bracket;
   a sector fixed to said brake pedal lever through positioning means for positioning said sector on said brake pedal lever, and fastening means for fastening said sector to said brake pedal lever, said sector having an arcuate end portion with teeth formed thereon, said positioning means having at least one protrusion formed on one of said sector and said brake pedal lever, and at least one bore for receiving said protrusion formed on the other of said sector and said brake pedal lever, and wherein said fastening means comprises a connecting pin for penetrating said sector and said brake pedal lever and connecting therebetween;
   a pawl having at least a tooth at one end thereof, said pawl being pivotally mounted on said bracket and biased toward said sector so that said tooth of said pawl engages with said teeth of said sector; and
   a release lever pivotally mounted on said bracket and associated with said pawl for disengaging said pawl from said sector.

2. A pedal-operated parking brake for use in an automotive vehicle as set forth in claim 1, wherein said connecting pin is calked for connecting said sector and said brake pedal lever.

3. A pedal-operated parking brake for use in an automotive vehicle comprising:
   a bracket secured to a vehicle body;
   a brake pedal lever pivotally mounted on said bracket;
   a sector fixed to said brake pedal lever, said sector having an arcuate end portion with teeth formed thereon;
   a pawl having at least a tooth at one end thereof, said pawl being pivotally mounted on said bracket and biased toward said sector so that said tooth of said pawl engages with said teeth of said sector;
   a release lever pivotally mounted on said bracket and associated with said pawl for disengaging said pawl from said sector; and
   a damper mounted on said bracket, said damper including a support pin secured to said bracket on an axis substantially parallel with a pivot axis of said brake pedal lever for blocking rotation of said brake pedal lever moving perpendicularly to said pivot axis, said support pin having a tapered free end portion with a top end and a flange portion gradually extending outwardly therefrom, and said damper including a cylindrical resilient member mounted on said support pin through said top end of said free end portion and held by said flange portion.

4. A pedal-operated parking brake for use in an automotive vehicle as set forth in claim 3, wherein an inner diameter of a hollow portion of said cylindrical resilient member is smaller than an outer diameter of a body portion of said support pin surrounded by said cylindrical resilient member, and an outer diameter of said top end of said free end portion is smaller than said inner diameter of said cylindrical resilient member.

* * * * *